United States Patent
Lawson et al.

(10) Patent No.: US 8,375,696 B2
(45) Date of Patent: *Feb. 19, 2013

(54) INDEPENDENT MANIFOLD DUAL GAS TURBINE FUEL SYSTEM

(75) Inventors: William J. Lawson, Niskayuna, NY (US); Rahul Mohan Joshi, Orlando, FL (US)

(73) Assignee: General Electric Company, Schenectady, NY (US)

(*) Notice: Subject to any disclaimer, the term of this patent is extended or adjusted under 35 U.S.C. 154(b) by 874 days.

This patent is subject to a terminal disclaimer.

(21) Appl. No.: 12/114,899

(22) Filed: May 5, 2008

(65) Prior Publication Data

US 2009/0272097 A1 Nov. 5, 2009

(51) Int. Cl.
*F02C 3/20* (2006.01)
(52) U.S. Cl. .............. 60/39.463; 60/734; 60/39.465; 60/739; 60/772; 60/776
(58) Field of Classification Search .............. 60/772, 60/776, 734, 39.463, 39.465, 739
See application file for complete search history.

(56) References Cited

U.S. PATENT DOCUMENTS

| | | | |
|---|---|---|---|
| 4,949,538 A | 8/1990 | Iasillo et al. | |
| 6,298,652 B1 * | 10/2001 | Mittricker et al. | 60/780 |
| 6,779,333 B2 * | 8/2004 | Gerhold | 60/39.53 |
| 6,907,737 B2 * | 6/2005 | Mittricker et al. | 60/772 |
| 2006/0016198 A1 * | 1/2006 | Stuttaford et al. | 60/776 |

* cited by examiner

*Primary Examiner* — William H Rodriguez
*Assistant Examiner* — Craig Kim
(74) *Attorney, Agent, or Firm* — Sutherland Asbill & Brennan LLP

(57) ABSTRACT

The present application provides a dual gas fuel delivery system and a method of delivering two gas fuels. The system may include (a) a low energy gas delivery system comprising a low energy gas inlet, a gas split, a low energy gas primary manifold outlet, and a low energy gas secondary manifold outlet; (b) a high energy gas delivery system comprising a high energy gas inlet and a high energy gas primary manifold outlet; (c) a primary manifold; and (d) a secondary manifold, wherein the low energy gas primary manifold outlet and the high energy gas primary manifold outlet are coupled to the primary manifold, wherein the low energy gas secondary manifold outlet is coupled to the secondary manifold, and wherein the low energy gas delivery system further comprises a primary low energy gas stop and pressure control valve between the gas split and the low energy gas primary manifold outlet.

11 Claims, 1 Drawing Sheet

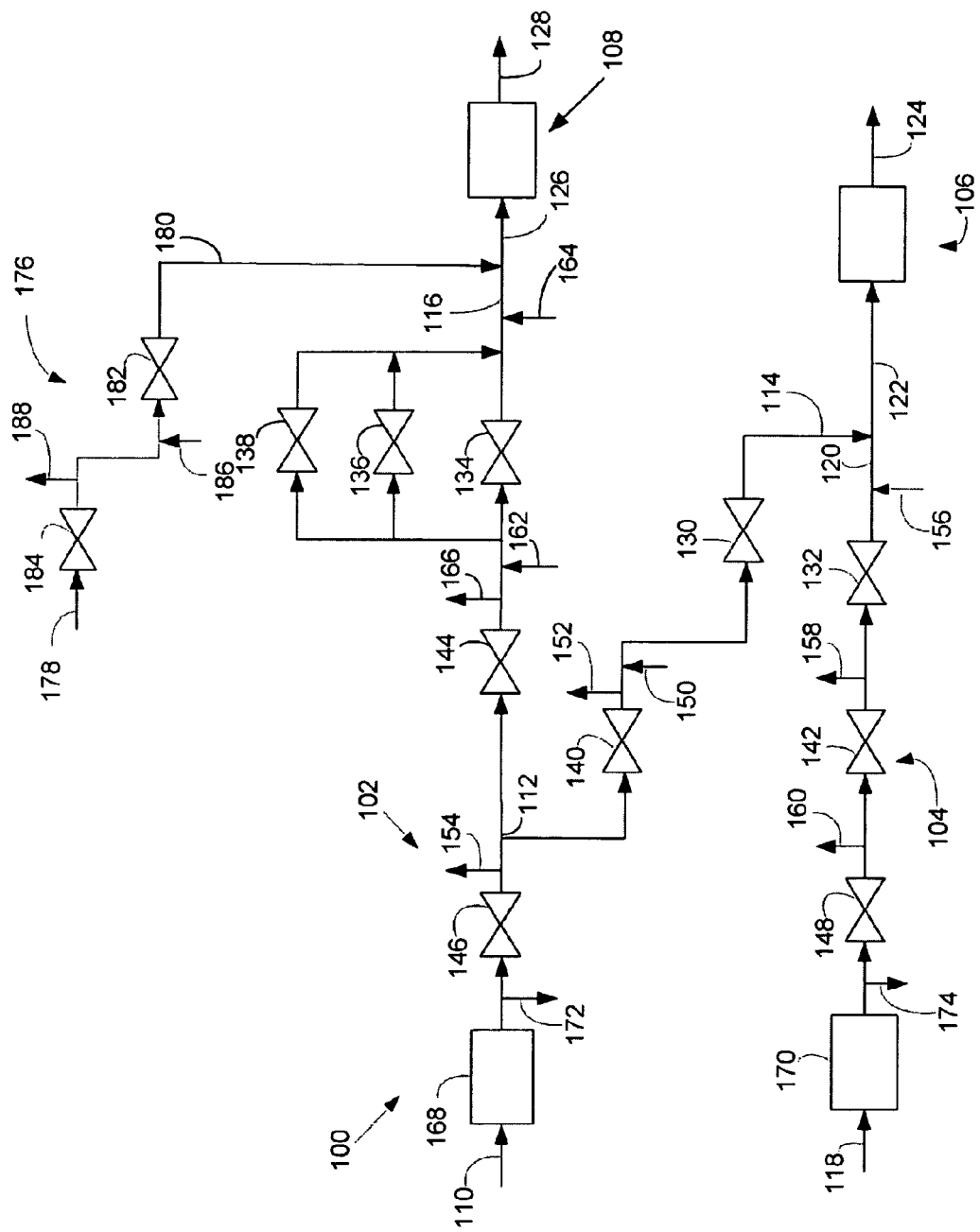

ions Ser. No. 12/114,893 entitled "Single Manifold Dual Gas Turbine Fuel System;" U.S. patent application Ser. No. 12/114,905 entitled "Primary Manifold Dual Gas Fuel System;" and U.S. patent application Ser. No. 12/114,911 entitled "Operation of Dual Gas turbine Fuel System." These applications are incorporated herein by reference.

INDEPENDENT MANIFOLD DUAL GAS TURBINE FUEL SYSTEM

CROSS-REFERENCE TO RELATED APPLICATIONS

The present application relates to U.S. patent application Ser. No. 12/114,893 entitled "Single Manifold Dual Gas Turbine Fuel System;" U.S. patent application Ser. No. 12/114,905 entitled "Primary Manifold Dual Gas Fuel System;" and U.S. patent application Ser. No. 12/114,911 entitled "Operation of Dual Gas turbine Fuel System." These applications are incorporated herein by reference.

TECHNICAL FIELD

The present application relates to gas turbine fuel systems and more particularly relates to gas turbine fuel systems capable of delivering two or more gaseous fuels to a single manifold.

BACKGROUND OF THE INVENTION

Modern gas turbines require precise control of the fuel system. For example, a pressure drop across the fuel nozzles must be carefully maintained within a specified range in order to avoid combustor damage. In general, it may be difficult to operate a modern gas turbine on both a normal, high energy fuel (for example, natural gas) and a high hydrogen, low energy fuel (for example, syngas). What is desired, therefore, is a "dual gas" turbine fuel system that may both accommodate and control delivery of a high energy fuel, a low energy fuel, and a mix of high and low energy fuels.

The design of such a "dual gas" fuel system may be complicated by the different characteristics of the fuels. Operating a gas turbine with a low energy fuel requires a significantly higher volumetric flow rate than does operating a gas turbine with a high energy fuel. Furthermore, a low energy fuel, which is typically derived from a gasification process, often may be supplied at a temperature up to or exceeding 500° F. (about 260 degrees Celsius). These characteristics necessitate fuel system hardware that can accommodate and control large variations in both fuel temperature and volumetric flow rate. Unfortunately, this hardware may be large, complicated, and expensive. What is desired, therefore, is a "dual gas" turbine system that uses smaller, standard, simplified hardware so as to save hardware costs, maintenance costs, and floor space.

BRIEF DESCRIPTION OF THE INVENTION

The present application thus provides a dual gas fuel delivery system and a method of delivering two gas fuels.

The dual gas fuel delivery system may include (a) a low energy gas delivery system comprising a low energy gas inlet, a gas split, a low energy gas primary manifold outlet, and a low energy gas secondary manifold outlet; (b) a high energy gas delivery system comprising a high energy gas inlet and a high energy gas primary manifold outlet; (c) a primary manifold; and (d) a secondary manifold, wherein the low energy gas primary manifold outlet and the high energy gas primary manifold outlet are coupled to the primary manifold, wherein the low energy gas secondary manifold outlet is coupled to the secondary manifold, and wherein the low energy gas delivery system further comprises a primary low energy gas stop and pressure control valve between the gas split and the low energy gas primary manifold outlet.

The method of delivering fuel to a turbine may include (a) feeding a low energy gas to a low energy gas inlet of a low energy gas delivery system; (b) feeding a high energy gas to a high energy gas inlet of a high energy gas delivery system; (c) passing a first portion of the low energy gas through a primary low energy gas stop and pressure control valve; (d) feeding the first portion of the low energy gas to a primary manifold from a low energy gas primary manifold outlet of the low energy gas delivery system; (e) feeding a second portion of the low energy gas to a secondary manifold from a low energy gas secondary manifold outlet of the low energy gas delivery system; (f) feeding the high energy gas to the primary manifold from a high energy gas primary manifold outlet of the high energy gas delivery system; (g) feeding the high energy gas and the first portion of the low energy gas to a turbine from the primary manifold; and (h) feeding the second portion of the low energy gas to the turbine from the secondary manifold.

These and other features of the present application will become apparent to one of ordinary skill in the art upon review of the following detailed description when taken in conjunction with the drawings and the appended claims.

BRIEF DESCRIPTION OF THE DRAWINGS

FIG. 1 is a flow diagram that depicts an independent manifold dual gas fuel system.

DETAILED DESCRIPTION OF THE INVENTION

The present application provides a dual gas fuel delivery system and a method of delivering a number of gas fuels.

I. Independent Manifold Dual Gas Fuel Delivery System

Referring now to the drawings, FIG. 1 shows a configuration of an independent manifold dual gas fuel delivery system 100. The system 100 may be used to deliver a high energy gas, a low energy gas, or a mixture of the high energy gas and the low energy gas to a turbine. Importantly, the system 100 may deliver both high energy fuel and low energy fuel while only allowing the high energy fuel to enter a single manifold. By delivering the high energy fuel to only a single manifold, the system 100 may reduce the amount of energy stored in the manifolds and thereby reduce the risk of turbine over-speed.

The Gas Fuels

They system 100 may deliver a high energy gas, a low energy gas, or a mixture of high energy gas and low energy gas. The high energy gas may have an energy value in a range from about 900 to about 1100 BTU/ft$^3$. The low energy gas may have an energy value in a range from about 125 to about 350 BTU/ft$^3$. In a particular embodiment, the difference in energy values between the high energy gas and the low energy gas is in a range from about 550 to about 975 BTU/ft$^3$.

The Delivery System

The independent manifold dual gas fuel delivery system 100 may include a low energy gas delivery system 102, a high energy gas delivery system 104, a primary manifold 106, and a secondary manifold 108. The secondary manifold 108 may have a size that is larger than the size of the primary manifold 106. For example, the secondary manifold 108 may have a larger volume and/or fuel nozzle area as compared to the primary manifold 106. The application of both the primary manifold 106 and the secondary manifold 108 may allow the turbine to operate at a wide range of loads using either the low energy gas, the high energy gas, or a mixture of the high energy gas and the low energy gas.

The low energy gas delivery system 102 may include a low energy gas inlet 110, a gas split 112, a low energy gas primary manifold outlet 114, and a low energy gas secondary manifold outlet 116. The high energy gas delivery system 104 may include a high energy gas inlet 118 and a high energy gas primary manifold outlet 120. The primary manifold 106 may include a primary manifold piping inlet 122 and a primary manifold nozzle outlet 124. The secondary manifold 108 may include a secondary manifold piping inlet 126 and a secondary manifold nozzle outlet 128. The low energy gas primary manifold outlet 114 and the high energy gas primary manifold outlet 120 may be coupled to the primary manifold 106. For example, the low energy gas primary manifold outlet 114 and the high energy gas primary manifold outlet 120 may merge into the primary manifold piping inlet 122. The low energy gas secondary manifold outlet 116 may be coupled to the secondary manifold 108. For example, the low energy gas secondary manifold outlet 116 may merge into the secondary manifold piping inlet 126.

The low energy gas delivery system 102 also may include primary low energy gas control valve 130 between the gas split 112 and the low energy gas primary manifold outlet 114. Likewise, the high energy gas delivery system 104 also may include a high energy gas control valve 132 between the high energy gas inlet 118 and the high energy gas primary manifold outlet 120. The gas control valves 130 and 132 may control the flow of fuel to the primary manifold 106 so that a precise pressure drop is maintained across the primary manifold nozzle 124.

The low energy gas delivery system 102 also may include a secondary low energy gas control valve 134. The secondary low energy gas control valve 134 may be located between the gas split 112 and a low energy gas secondary manifold outlet 116. The secondary low energy gas control valve 134 may control the flow of fuel in the secondary manifold 108 so that a precise pressure drop is maintained across the secondary manifold nozzle outlet 128. The secondary low energy gas control valve 134 also may be used to stop the flow of gas through the secondary manifold 108.

The low energy gas delivery system 102 also may include any number of additional gas control valves. For example, the low energy gas delivery system 102 also may include a second secondary low energy gas control valve 136 and a third secondary low energy gas control valve 138. The control valves 136 and 138 may be located between the gas split 112 and a low energy gas secondary manifold outlet 116. The three control valves 134, 136 and 138 may operate in parallel. The use of multiple gas control valves may allow each control valve to be of a smaller size, which may in turn allow for the use of off the shelf gas control valves.

The low energy gas delivery system 102 also may include a primary low energy gas stop and pressure control valve 140 between the gas split 112 and the primary low energy gas control valve 130. Likewise, the high energy gas delivery system 104 also may include a high energy gas stop and pressure control valve 142 between the high energy gas inlet 118 and the high energy gas control valve 132. The stop and pressure control valves 140 and 142 may control the flow of fuel upstream of the gas control valves 130 and 132 so that a constant reference pressure is maintained between the stop and pressure control valves 140 and 142 and the gas control valves 130 and 132. By maintaining the areas of constant reference pressure immediately upstream of the gas control valves 130 and 132, the rate of flow through the gas control valves may be calculated using the only the positions (effective areas) of the control valves.

The low energy gas delivery system 102 also may include a secondary low energy gas stop and pressure control valve 144 between the gas split 112 and the secondary low energy gas control valve 134. The stop and pressure control valve 144 may control the flow of fuel upstream of the gas control valve 134 so that a constant reference pressure is maintained between the stop and pressure control valves 144 and the gas control valve 134. By maintaining the area of constant reference pressure immediately upstream of the gas control valve 134, the rate of flow through the gas control valve may be calculated using the only the position (effective area) of the control valve.

The low energy gas delivery system 102 also may include a low energy gas stop valve 146 between the low energy gas inlet 110 and the gas split 112. Likewise, the high energy gas delivery system 104 also may include high energy gas stop valve 148 between the high energy gas inlet 118 and the high energy gas stop and pressure control valve 142. The stop valves 146 and 148 may be used to stop the flow of gas through the low energy gas delivery system 102 and the high energy gas delivery system 104, respectively. For example, if the turbine is operating on high energy gas only, the low energy gas stop valve 146 may stop the flow of gas through the low energy gas delivery system 102 so that only high energy fuel will flow through the primary manifold 106. Furthermore, if the turbine is operating on low energy gas only, the high energy gas stop valve 148 may stop the flow of gas through the high energy gas delivery system 104 so that only low energy fuel will flow through the primary manifold 106.

The low energy gas delivery system 102 also may include a primary low energy gas purge system between the low energy gas inlet 110 and the primary low energy gas control valve 130. The primary low energy gas purge system may include a primary low energy gas purge inlet 150, a first primary low energy gas purge vent 152, and a second primary low energy gas vent 154. The primary low energy gas purge inlet 150 may be located between the primary low energy gas control valve 130 and the primary low energy gas stop and pressure control valve 140, the first primary low energy gas purge vent 152 may be located between the primary low energy gas control valve 130 and the primary low energy gas stop and pressure control valve 140, and the second primary low energy gas vent 154 may be located between the primary low energy gas stop and pressure control valve 140 and the low energy gas stop valve 146. The primary low energy gas purge system may be used to reduce the risk of combustion when the low energy gas delivery system 102 is not in use.

The high energy gas delivery system 104 also may include a high energy gas purge system between the high energy gas inlet 118 and the high energy gas outlet 120. The high energy gas purge system may include a high energy gas purge inlet 156, a first high energy gas vent 158, and a second high energy vent 160. The high energy gas purge inlet 156 may be located between either (a) the high energy gas control valve 132 and the primary manifold nozzle outlet 124 or (b) the low energy gas control valve 130 and the primary manifold nozzle outlet 124, the first high energy gas vent 158 may be located between the high energy gas control valve 132 and the high energy gas stop and pressure control valve 142, and the second high energy gas vent 160 may be located between the high energy gas stop and pressure control valve 142 and the high energy gas stop valve 148. The gas purge system may be used to reduce the risk of combustion during trip of the turbine while running a mix of high and low energy gas or low energy gas only in both manifolds.

The low energy gas delivery system 102 also may include a secondary low energy gas purge system between the gas split 112 and the secondary low energy gas control valve 134. The secondary low energy gas purge system may include a first secondary low energy gas purge inlet 162, a second secondary low energy gas purge inlet 164, and a secondary low energy gas purge vent 166. The first secondary low energy gas purge inlet 162 and the secondary low energy gas purge vent 166 may be located between the secondary low energy gas stop and pressure control valve 144 and the secondary low energy gas control valve 134, and the second secondary low energy gas purge inlet 164 may be located between the secondary low energy gas control valve 134 and the secondary manifold nozzle outlet 128. The secondary manifold purge system may be used to reduce the risk of combustion when the secondary manifold 108 is not in use. For example, the first secondary low energy gas purge inlet 162 and the secondary low energy gas purge vent 166 may create an inert gas pressure buffer between the secondary low energy gas stop and pressure control valve 144 and the secondary low energy gas control valve 134 in order isolate the low energy fuel from the CPD purge air.

The low energy gas delivery system 102 also may include a low energy gas strainer 168 between the low energy gas inlet 110 and the low energy gas stop valve 146. Likewise, the high energy gas delivery system 104 also may include a high energy gas strainer 170 between the high energy gas inlet 118 and the high energy gas stop valve 148. The strainers 168 and 170 may filter debris out of the fuel in order to prevent problems such as clogging in the independent manifold dual gas fuel delivery system 100.

The low energy gas delivery system 102 also may contain a low energy gas bypass outlet 172 between the low energy gas inlet 110 and the low energy gas stop valve 146. Likewise, the high energy gas delivery system 104 also may include a high energy gas bypass outlet 174 between the high energy gas inlet 118 and the high energy has stop valve 148. The bypass outlets 172 and 174 may feed gas to systems such as a vent or flare for condensation risk mitigation.

The independent manifold dual gas fuel delivery system 100 also may include a compressor discharge pressure system 176 ("CPD system"). The CPD system 176 may include a CPD air inlet 178 and a CPD air outlet 180. The CPD system 176 may be coupled to the secondary manifold 108. For example, CPD air outlet 180 may merge into the secondary manifold piping inlet 126. The CPD system 176 may be used to purge the secondary manifold 108 of gas, maintain a positive nozzle pressure ratio in the secondary manifold 108, and/or keep the secondary manifold nozzle outlet 128 cool.

The CPD system 176 may include a primary CPD valve 182 between the CPD air inlet 178 and the CPD air outlet 180. The CPD system 176 also may include a secondary CPD valve 184 between the CPD air inlet 178 and the primary CPD valve 182. The CPD valves 182 and 184 may control the flow of air to the secondary manifold 108 so that a precise pressure drop is maintained across the secondary manifold nozzle outlet 128.

The CPD system 176 also may include a CPD gas purge inlet 186 and a CPD gas purge vent 188. The CPD gas purge inlet 186 and the CPD gas purge vent 188 may be located between the secondary CPD valve 184 and the primary CPD valve 182. The CPD gas purge inlet 186 and the CPD gas purge vent 188 may be used to reduce the risk of combustion when the CPD system 176 is not in use. For example, the CPD gas purge inlet 186 and the CPD gas purge vent 188 may create an inert gas pressure buffer between the secondary CPD valve 184 and the primary CPD valve 182 in order isolate the low energy gas from the CPD air.

The independent manifold dual gas fuel delivery system 100 may be used to deliver two gas fuels to a turbine. A low energy gas may be fed to the low gas energy inlet 110 of the low energy gas delivery system 102. A first portion of the low energy gas then may be fed to the primary manifold piping inlet 122 of the primary manifold 106 from the low energy gas primary manifold outlet 114 of the low energy gas delivery system 102, and a second portion of the low energy gas may be fed to the secondary manifold piping inlet 126 of the secondary manifold 108 from the low energy gas secondary manifold outlet 116 of the low energy gas delivery system 102. Furthermore, the first portion of the low energy gas may be passed through the primary low energy gas stop and pressure control valve 140 after the step of feeding the low energy gas to the low energy gas delivery system 102 and before the step of feeding the first portion of the low energy gas to the primary manifold 106. A high energy gas may be fed to the high energy gas inlet 118 of the high energy gas delivery system 104. The high energy gas then may be fed to the primary manifold piping inlet 122 of the primary manifold 106 from the high energy gas primary manifold outlet 120 of the high energy gas delivery system 104.

The high energy gas and the first portion of the low energy gas may be fed to the turbine from the primary manifold nozzle outlet 124 of the primary manifold 106. The second portion of the low energy gas may be fed to the turbine from the secondary manifold piping outlet 128 of the secondary manifold 108.

The method of delivering the two gas fuels to the turbine may include a step of passing the first portion of the low energy gas through the primary low energy gas control valve 130 after the step of passing the first portion of the low energy gas through the primary low energy gas stop and pressure control valve 140 and before the step of feeding the first portion of the low energy gas to the primary manifold 106. The method also may include a step of passing the second portion of the low energy gas through the secondary low energy gas control valve 134 after the step of feeding the low energy gas to the low energy gas delivery system 102 and before the step of feeding the second portion of the low energy gas to secondary manifold 108. Furthermore, the method may include a step of passing the second portion of the low energy gas through the secondary low energy gas stop and pressure control valve 144 after the step of feeding the low energy gas to the low energy gas delivery system 102 and before the step of feeding the second portion of the low energy gas through the secondary low energy gas control valve 134. Finally, the method of delivering the two gas fuels to the turbine may include passing the low energy gas through the low energy gas stop valve 146 after the step of feeding the low energy gas to the low energy gas delivery system 102 and before the steps of passing the first portion of the low energy gas through the primary low energy gas stop and pressure control valve 140 and passing the second portion of the low energy gas through the secondary low energy gas stop and pressure control valve 144.

The method of delivering the two gas fuels to the turbine may include a step of passing the high energy gas through the high energy gas control valve 132 after the step of feeding the high energy gas to the high energy gas delivery system 104 and before the step of feeding the high energy gas to the primary manifold 106. The method also may include a step of passing the high energy gas through the high energy gas stop and pressure control valve 142 after the step of feeding the high energy gas to the high energy gas delivery system 104 and before the step of passing the high energy gas through the high energy gas control valve 132. Finally, the method of delivering the two gas fuels to the turbine may include passing the high energy gas through the high energy gas stop valve 148 after the step of feeding the high energy gas to the high energy gas delivery system 104 and before the step of passing the high energy gas through the high energy gas stop and pressure control valve 142.

It should be understood that the foregoing relates only to the preferred embodiments of the present application and that numerous changes and modifications may be made herein without departing from the general spirit and scope of the invention as defined by the following claims and the equivalents thereof.

We claim:

1. A fuel delivery system, comprising:
   a turbine operable at a range of loads from a start-up load to a full load;
   a primary manifold for supplying a fuel composition to the turbine, the fuel composition comprising a low energy gas, a high energy gas, or a blend of the low energy gas and the high energy gas;
   a secondary manifold for supplying the low energy gas to the turbine;
   a low energy gas delivery system comprising a low energy gas inlet, a gas split for feeding a first portion of the low energy gas to the primary manifold and feeding a second portion of the low energy gas to the secondary manifold, a low energy gas primary manifold outlet coupled to the primary manifold, a low energy gas secondary manifold outlet coupled to the secondary manifold, and a primary low energy gas stop and pressure control valve between the gas split and the low energy gas primary manifold outlet; and
   a high energy gas delivery system comprising a high energy gas inlet and a high energy gas primary manifold outlet coupled to the primary manifold,
   wherein the fuel delivery system is configured to allow the high energy gas to be delivered only to the primary manifold low energy gas.

2. The system of claim 1, wherein:
   the low energy gas delivery system further comprises a primary low energy gas control valve between the primary low energy gas stop and pressure control valve and the low energy gas primary manifold outlet;
   the low energy gas delivery system further comprises a secondary low energy gas control valve between the gas split and the low energy gas secondary manifold outlet; and
   the high energy gas delivery system further comprises a high energy gas control valve between the high energy gas inlet and the high energy gas primary manifold outlet.

3. The system of claim 2, wherein:
   the low energy gas delivery system further comprises a secondary low energy gas stop and pressure control valve between the gas split and the secondary low energy gas control valve; and
   the high energy gas delivery system further comprises a high energy gas stop and pressure control valve between the high energy gas inlet and the high energy gas control valve.

4. The system of claim 3, wherein:
   the low energy gas delivery system further comprises a low energy gas stop valve between the low energy gas inlet and the gas split; and
   the high energy gas delivery system further comprises a high energy gas stop valve between the high energy gas inlet and the high energy stop and pressure control valve.

5. The system of claim 2, wherein:
   the low energy gas delivery system further comprises a primary low energy gas purge system between the low energy gas inlet and the primary low energy gas control valve;
   the low energy gas delivery system further comprises a secondary low energy gas purge system between the gas split and the secondary low energy gas control valve; and
   the high energy gas delivery system further comprises a high energy gas purge system between the high energy gas inlet and the high energy gas primary manifold outlet.

6. The system of claim 1, further comprising:
   a compressor discharge pressure system comprising a compressor discharge pressure inlet and a compressor discharge pressure outlet, wherein the compressor discharge pressure outlet is coupled to the secondary manifold.

7. The system of claim 6, wherein:
   the compressor discharge pressure system further comprises a compressor discharge pressure valve between the compressor discharge pressure inlet and the compressor discharge pressure outlet.

8. A method of delivering a fuel composition to a turbine, comprising:
   providing a fuel delivery system, the fuel delivery system comprising:
      a turbine operable at a range of loads from a start-up load to a full load;
      a primary manifold for supplying a fuel composition to the turbine, the fuel composition comprising a low energy gas, a high energy gas, or a blend of the low energy gas and the high energy gas;
      a secondary manifold for supplying the low energy gas to the turbine;
      a low energy gas delivery system comprising a low energy gas inlet, a gas split for feeding a first portion of the low energy gas to the primary manifold and feeding a second portion of the low energy gas to the secondary manifold, a low energy gas primary manifold outlet coupled to the primary manifold, a low energy gas secondary manifold outlet coupled to the secondary manifold, and a primary low energy gas stop and pressure control valve between the gas split and the low energy gas primary manifold outlet; and
      a high energy gas delivery system comprising a high energy gas inlet and a high energy gas primary manifold outlet coupled to the primary manifold;
   feeding the low energy gas to the low energy gas inlet of the low energy gas delivery system;
   feeding the high energy gas to the high energy gas inlet of the high energy gas delivery system;
   passing the first portion of the low energy gas through the primary low energy gas stop and pressure control valve;
   feeding the first portion of the low energy gas to the primary manifold from the low energy gas primary manifold outlet of the low energy gas delivery system;
   feeding a second portion of the low energy gas to the secondary manifold from the low energy gas secondary manifold outlet of the low energy gas delivery system;
   feeding the high energy gas to the primary manifold from the high energy gas primary manifold outlet of the high energy gas delivery system;
   feeding the high energy gas and the first portion of the low energy gas to the turbine from the primary manifold; and
   feeding the second portion of the low energy gas to the turbine from the secondary manifold, wherein the fuel delivery system is configured to allow the high energy gas to be delivered only to the primary manifold.

9. The method of claim 8, further comprising:

passing the first portion of the low energy gas through a primary low energy gas control valve after the step of passing the first portion of the low energy gas through the primary low energy gas stop and pressure control valve and before the step of feeding the first portion of the low energy gas to the primary manifold;

passing the second portion of the low energy gas through a secondary low energy gas control valve after the step of feeding the low energy gas to the low energy gas delivery system and before the step of feeding the second portion of the low energy gas to the secondary manifold; and passing the high energy gas through a high energy gas control valve after the step of feeding the high energy gas to the high energy gas delivery system and before the step of feeding the high energy gas to the primary manifold.

10. The method of claim 9, further comprising:

passing the second portion of the low energy gas through a secondary low energy gas stop and pressure control valve after the step of feeding the low energy gas to the low energy gas delivery system and before the step of passing the second portion of the low energy gas through the secondary low energy gas control valve; and passing the high energy gas through a high energy gas stop and pressure control valve after the step of feeding the high energy gas to the high energy gas delivery system and before the step of passing the high energy gas through the high energy gas control valve.

11. The method of claim 10, further comprising:

passing the low energy gas through a low energy gas stop valve after the step of feeding the low energy gas to the low energy gas delivery system and before the steps of passing the first portion of the low energy gas through the primary low energy gas stop and pressure control valve and passing the second portion of the low energy gas through the secondary low energy gas stop and pressure control valve; and passing the high energy gas through a high energy gas stop valve after the step of feeding the high energy gas to the high energy gas delivery system and before the step of passing the high energy gas through the high energy gas stop and pressure control valve.

* * * * *

UNITED STATES PATENT AND TRADEMARK OFFICE
CERTIFICATE OF CORRECTION

PATENT NO. : 8,375,696 B2  
APPLICATION NO. : 12/114899  
DATED : February 19, 2013  
INVENTOR(S) : William J. Lawson et al.

Page 1 of 1

It is certified that error appears in the above-identified patent and that said Letters Patent is hereby corrected as shown below:

In Column 7, line 38, delete "lower energy gas".

Signed and Sealed this  
Ninth Day of April, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,375,696 B2
APPLICATION NO. : 12/114899
DATED : February 19, 2013
INVENTOR(S) : William J. Lawson et al.

It is certified that error appears in the above-identified patent and that said Letters Patent is hereby corrected as shown below:

In the Claims:

In Column 7, line 38, delete "low energy gas".

This certificate supersedes the Certificate of Correction issued April 9, 2013.

Signed and Sealed this
Fourth Day of June, 2013

Teresa Stanek Rea
*Acting Director of the United States Patent and Trademark Office*